US012695159B2

(12) United States Patent
Sakurai et al.

(10) Patent No.: US 12,695,159 B2
(45) Date of Patent: Jul. 28, 2026

(54) SECONDARY BATTERY AND ASSEMBLED BATTERY

(71) Applicant: PRIME PLANET ENERGY & SOLUTIONS, INC., Tokyo (JP)

(72) Inventors: Takahiro Sakurai, Nagoya (JP); Kosuke Suzuki, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 667 days.

(21) Appl. No.: 17/571,925

(22) Filed: Jan. 10, 2022

(65) Prior Publication Data

US 2022/0238965 A1     Jul. 28, 2022

(30) Foreign Application Priority Data

Jan. 28, 2021     (JP) ................................. 2021-011630

(51) Int. Cl.
*H01M 50/516*     (2021.01)
*H01M 50/176*     (2021.01)
(Continued)

(52) U.S. Cl.
CPC ....... *H01M 50/516* (2021.01); *H01M 50/176* (2021.01); *H01M 50/505* (2021.01);
(Continued)

(58) Field of Classification Search
CPC ............. H01M 50/562; H01M 50/553; H01M 50/505; H01M 50/176; H01M 50/516
See application file for complete search history.

(56) References Cited

U.S. PATENT DOCUMENTS 6,410,186 B1 *     6/2002     Tucholski ........... H01M 50/154
                                                           429/185
2014/0178755 A1     6/2014     Oda et al.
(Continued)

FOREIGN PATENT DOCUMENTS

CN          103155223 A          6/2013
CN          104904036 A          9/2015
(Continued)

OTHER PUBLICATIONS

Enhanced electrochemical performance of Al—0.9Mg—1Zn—0.1Mn—0.05Bi—0.02In fabricated from commercially pure aluminum for use as the anode of alkaline batteries. by Hamed Moghanni-Bavil-Olyaei and Jalal Arjomandi (RSC Advances) (Year: 2016).*
(Continued)

*Primary Examiner* — Barbara L Gilliam
*Assistant Examiner* — Lawrence La Raia, III
(74) *Attorney, Agent, or Firm* — Finnegan, Henderson, Farabow, Garrett and Dunner, LLP

(57)          ABSTRACT

According to the present disclosure, the thermal deterioration of metal junction parts formed on a contact interface of constitution members of electrode terminals is suppressed. The electrode terminal of the secondary battery disclosed herein includes a first member having a plate-shaped connection part and a plate-shaped second member connected to the connection part of the first member in a surface-contact manner. Then, the technique disclosed herein includes a metal junction part and a heat-insulating part formed on a contact interface between a connection part of the first member and the second member, and the heat-insulating part is formed outward of the metal junction part in a radial direction centered on the metal junction part. Due to this constitution, the heat-insulating part can block great heat even when such a great heat is applied to a region outside the
(Continued)

heat-insulating part, and therefore, the heat deterioration of the metal junction part can be suppressed.

5 Claims, 6 Drawing Sheets

(51) Int. Cl.

| | | |
|---|---|---|
| *H01M 50/505* | (2021.01) | |
| *H01M 50/553* | (2021.01) | |
| *H01M 50/562* | (2021.01) | |
| *H01M 50/566* | (2021.01) | |

(52) U.S. Cl.

CPC ....... *H01M 50/553* (2021.01); *H01M 50/562* (2021.01); *H01M 50/566* (2021.01)

(56) References Cited

U.S. PATENT DOCUMENTS

| | | | |
|---|---|---|---|
| 2014/0193678 A1 | 7/2014 | Kim | |
| 2015/0086867 A1 | 3/2015 | Oda et al. | |
| 2015/0318519 A1 | 11/2015 | Tsutsumi et al. | |
| 2016/0248073 A1 | 8/2016 | Jang et al. | |
| 2016/0254517 A1 | 9/2016 | Tsunaki et al. | |
| 2018/0034095 A1* | 2/2018 | Yoshida ................ | H01M 50/26 |
| 2019/0198850 A1 | 6/2019 | Asakura et al. | |
| 2020/0075923 A1 | 3/2020 | Takabayashi et al. | |
| 2020/0168860 A1 | 5/2020 | Enomoto et al. | |
| 2020/0235351 A1 | 7/2020 | Yamazaki et al. | |
| 2020/0251711 A1* | 8/2020 | Wakimoto .......... | H01M 50/103 |
| 2021/0104796 A1* | 4/2021 | Wakimoto .......... | H01M 50/176 |

FOREIGN PATENT DOCUMENTS

| | | |
|---|---|---|
| CN | 110875462 A | 3/2020 |
| CN | 111446406 A | 7/2020 |
| JP | 2009-301982 A | 12/2009 |
| JP | 2011-124024 A | 6/2011 |
| JP | 2015-011785 A | 1/2015 |
| JP | 2015-056273 A | 3/2015 |
| JP | 2015-88443 A | 5/2015 |
| JP | 5840207 B2 | 1/2016 |
| JP | 2016-129125 A | 7/2016 |
| JP | 2019-75308 A | 5/2019 |
| JP | 2020-35694 A | 3/2020 |
| WO | WO 2012/169055 A1 | 12/2012 |
| WO | WO 2014/103874 A1 | 7/2014 |
| WO | WO 2015/059826 A1 | 4/2015 |
| WO | WO 2017/090706 A1 | 6/2017 |

OTHER PUBLICATIONS

Uncovering Why Copper Improves a Battery's Cathode and Overall Performance. by Laura Mgrdichian-West (Brookhaven National Laboratory) May 31, 2017 (Year: 2017).*

* cited by examiner

20

SECONDARY BATTERY AND ASSEMBLED BATTERY

CROSS REFERENCE TO RELATED APPLICATIONS

This application claims the benefit of foreign priority to Japanese Patent Application No. 2021-11630, filed on Jan. 28, 2021, the entire contents of which are incorporated herein by reference.

BACKGROUND

1. Technical Field

The present disclosure relates to a secondary battery provided with an electrode terminal and an assembled battery including a plurality of secondary batteries.

2. Description of the Related Art

Secondary batteries such as lithium ion secondary batteries and nickel hydrogen batteries are currently used in a wide variety of fields such as vehicles and mobile devices. A secondary battery normally has electrode bodies, which are power generation elements, and a battery case for housing the electrode bodies. Furthermore, a structure in which electrode terminals connected to the electrode bodies in a battery case are led out to the case exterior is adopted in such a secondary battery. Then, the electrode terminals led out to the case exterior are connected to the exterior apparatus, another battery, or the like via the exterior connection member such as a bus bar.

A structure disclosed in JP 2011-124024 A is mentioned as one example of a conventional technique relating the electrode terminals. The electrode terminal disclosed in JP 2011-124024 A includes an exterior terminal with a good weld quality to a bus bar, and a base part having one end joined to an exterior terminal and the other end connected to an electrode body. In the technique disclosed in JP 2011-124024 A, joining the base part and the exterior terminal by ultrasonication is recommended. Joining the constitution members of electrode terminals by metal-to-metal joining using ultrasonication or the like enables to provide suitable joint strength and improve the conductivity at the interface between the members.

SUMMARY

However, the study made by the present inventor revealed that techniques to join the constitution members of electrode terminals by metal-to-metal joining have room for improvement. Specifically, thermal welding such as laser welding is normally used for connecting an electrode terminal led out to the exterior of a battery case and a bus bar. When large heat upon such thermal welding is transmitted to the joining mark (metal junction part) formed by metal-to-metal joining, the metal junction part may be deteriorated by heat, and the joint strength and conductivity may be lower in some cases.

The present disclosure has been made to solve such problems and has an object to provide a technique for suppressing thermal deterioration of metal junction parts formed on contact surfaces of constitution members of electrode terminals.

To reach the above objective, the technique disclosed herein provides a secondary battery having the constitution described below.

The secondary battery disclosed herein includes: an electrode body; a battery case housing the electrode body; and an electrode terminal connected to the electrode body in the battery case and partly exposed to the exterior of the battery case. The electrode terminals of such a secondary battery include a first member having one end positioned in the battery case and another end positioned outside the battery case and a plate-shaped second member connected to the first member at an outside of the battery case. Furthermore, the first member includes a shaft part penetrating the battery case and a plate-shaped connection part that is formed on a top edge of the shaft part and in surface contact with the second member. Then, the secondary battery disclosed herein includes a metal junction part and a heat-insulating part formed on a contact interface between a connection part of the first member and the second member, and the heat-insulating part is formed outward of the metal junction part in a radial direction centered on the metal junction part.

In the secondary battery disclosed herein, a metal junction part is formed on the contact interface between the first member and the second member, which are constitution members of electrode terminals. Such a metal junction part is a joining mark by metal-to-metal joining such as ultrasonic joining, laser welding, or resistance welding. Then, in the secondary battery disclosed herein, a heat-insulating part is formed outward of the metal junction part in a radial direction centered on the metal junction part. Due to this constitution, the heat-insulating part can block great heat (for example, welding heat or the like) even when such a great heat is applied to a region outside the heat-insulating part, and therefore, the heat deterioration of the metal junction part can be suppressed.

In a suitable embodiment of the secondary battery disclosed herein, the heat-insulating part is a cavity formed by a part of a bottom surface of the second member separating from a top surface of the connection part. According to such a constitution, the thermal deterioration of the metal junction part can be suppressed at a low cost.

In a suitable embodiment of the secondary battery disclosed herein, the heat-insulating part is a heat-insulating material filled in a space between a bottom surface of the connection part and a top surface of the second member. According to such a constitution, the thermal deterioration of the metal junction part can be more suitably suppressed.

In a suitable embodiment of the secondary battery disclosed herein, the heat-insulating part is a ring-shaped heat-insulating part formed so as to surround the metal junction part in plan view Due to this constitution, the thermal deterioration of the metal junction part can be more suitably suppressed.

In a suitable embodiment of the secondary battery disclosed herein, the first member and the second member are constituted of different metal materials. Then, the technique disclosed herein can be particularly suitably used for joining dissimilar metals, in which metal bonding is recommended because the thermal deterioration of the metal junction part can be suppressed.

As another aspect of the technique disclosed herein, an assembled battery including a plurality of secondary batteries mutually electrically connected via a flat plate-shaped bus bar is provided. In the assembled battery disclosed herein, at least one of the plurality of secondary batteries is the secondary battery having the above structure. The bus bar is in surface contact with a top surface of the second member, and the bus bar and the second member are connected by a thermally welded part penetrating the bus bar to reach the second member. Then, in the assembled battery disclosed herein, the thermally welded part is formed upward of the heat-insulating part or outward of the heat-insulating part in a radial direction centered on the metal junction part. Due to this constitution, the heat generated upon forming the thermally welded part is blocked by the heat-insulating part, and therefore, thermal deterioration of the metal junction part upon connecting the bus bar can be suitably suppressed.

In a suitable embodiment of the assembled battery disclosed herein, the heat-insulating part is a cavity formed by a part of the bottom surface of the second member separating from the top surface of the connection part. According to such a constitution, the thermal deterioration of the metal junction part can be suppressed at a low cost.

In an embodiment in which a cavity is disposed as the heat-insulating part, assuming that, in plan view, a distance from a center of the metal junction part to an outer periphery of the metal junction part is taken as L1, a distance from a center of the metal junction part to an inner edge of the heat-insulating part is taken as L2, and a distance from a center of the metal junction to a center of the thermally welded part is taken as L3, it is preferred to satisfy the following formula (1). Due to this constitution, the heat generated upon forming the thermally welded part can be sufficiently blocked by the heat-insulating part, and therefore, the thermal deterioration of the metal junction part can be more suitably suppressed.

$$L3-L2>L2-L1 \qquad (1)$$

DETAILED DESCRIPTION

Figure 1:
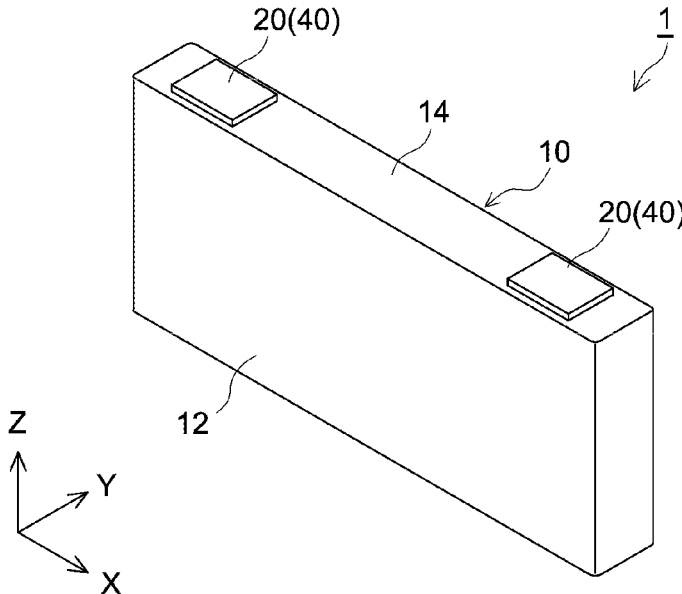
FIG. 1 is a perspective view schematically illustrating a secondary battery according to one embodiment.

Now, one embodiment of the technique disclosed herein is described below. Note that the following embodiment is not intended to limit the technique disclosed herein. Matters other than those specifically mentioned in the description but necessary for implementing the technique disclosed herein may be recognized as design matters for a person skilled in the art based on conventional techniques in the art. That is, the technique disclosed herein can be implemented based on the content disclosed in the present description and common general technical knowledge in the art.

In the drawings referred to in the explanation below, members and sites having the same effect are assigned with the same numerals or symbols. The dimensional relationships (lengths, widths, thicknesses, etc.) in each figure do not reflect actual dimensional relationships. The symbol X represents a "width direction", the symbol Y represents a "depth direction", and the symbol Z represents a "height direction" in each figure. However, these directions are defined for explanatory convenience and are not intended to limit the mode of installation of the secondary battery or the assembled battery during use or production.

In addition, the term "secondary battery" in the present description refers to a power storage device in general that causes a discharging and charging reaction by the transfer of a charge carrier between a pair of electrodes (positive and negative electrodes) via electrolytes. Such secondary batteries encompass a so-called storage battery such as a secondary lithium battery, a nickel hydrogen battery, and a nickel cadmium battery, and a capacitor such as an electric double layer capacitor. The technique disclosed herein is not limited to a specific type of secondary battery and can be applied to all secondary batteries having electrode terminals and assembled batteries constructed using such secondary batteries without particular limitations.

1. Secondary Battery

Figure 2:
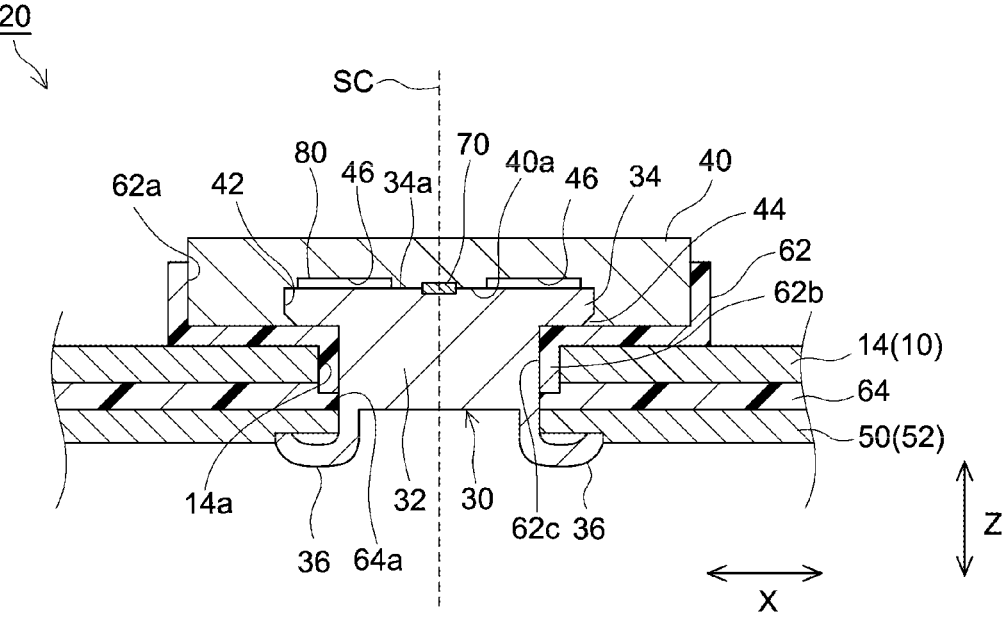
FIG. 2 is a sectional view schematically illustrating the vicinity of the electrode terminal of a secondary battery according to one embodiment.
Figure 3:
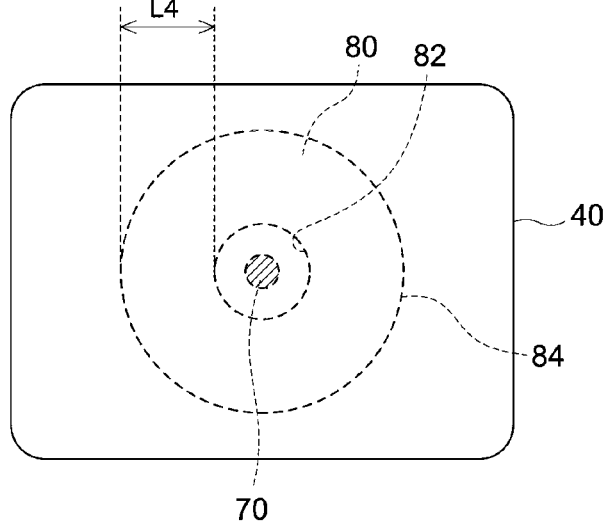
FIG. 3 is a plan view explaining the positional relationship between the metal junction part and the heat-insulating part in the secondary battery according to one embodiment.

Hereinafter, the structure of the secondary battery according to the present embodiment is described with reference to FIGS. 1 to 3. FIG. 1 is a perspective view schematically illustrating a secondary battery according to the present embodiment. FIG. 2 is a sectional view schematically illustrating the structure in the vicinity of the electrode terminal of a secondary battery according to the present embodiment. FIG. 3 is a plan view explaining the positional relationship between the metal junction part and the heat-insulating part in the electrode terminal of the secondary battery according to the present embodiment.

(1) Overall Constitution

As illustrated in FIG. 1, the secondary battery 1 according to the present embodiment includes an electrode body (not illustrated), a battery case 10, and an electrode terminal 20. Each constitution thereof is explained below.

(2) Electrode Body

The electrode body is a power generation element housed in the battery case 10. The structure of the electrode body is not particularly limited, and various structures that can be adopted in a general secondary battery can be adopted without particular limitations. For example, a structure wherein a positive electrode and a negative electrode are superimposed via a separator may be adopted for the electrode body. Examples of this type of electrode body structure include a wound electrode in which long belt-shaped positive electrode, negative electrode, and separator are rolled up, a laminated electrode body in which rectangular sheet-shaped positive electrode, negative electrode, and separator are stacked, and the like. Note that, regarding the specific structure and the material of each member (the positive electrode, the negative electrode, and the separator) constituting the electrode body, those that may be adopted in a general secondary battery (for example, lithium ion secondary battery) may be adopted without particular limitations. That is, the structure and the material of each member constituting the electrode body do not limit the technique disclosed herein, and thus, specific explanations therefor are omitted.

Although the illustration is omitted, in the secondary battery according to the present embodiment, an electrolyte is also housed in the battery case 10 in addition to the electrode body. As the electrolyte, non-aqueous liquid electrolyte (non-aqueous electrolyte) containing a non-aqueous solvent and a supporting electrolyte, a solid electrolyte obtained by molding a powdery electrolyte into a sheet shape, or the like may be used. Note that the specific component of the electrolyte does not limit the technique disclosed herein, and thus, specific explanations therefor are omitted.

(3) Battery Case

The battery case 10 is a container that houses the electrode body or the electrolyte mentioned above. As illustrated in FIG. 1, the battery case 10 according to the present embodiment is a container having a flat rectangular shape. The rectangular battery case 10 includes a case main body 12 having a flat rectangular shape opened at the top surface and a plate-shaped lid 14 for closing the top surface opening of the case main body 12. Although details will be described later, a terminal insertion hole 14a, which is an opening for inserting electrode terminals 20 (first members 30), is disposed at each of both ends of the lid 14 in the width direction X as illustrated in FIGS. 1 and 2. Note that the outer shape of the battery case is not limited to the shape as mentioned above and may be appropriately changed according to the standard of exterior apparatuses, the shape of the electrode, or the like. For example, the battery case may be a bottomed cylindrical case. The material of the battery case 10 is not particularly limited as long as the material having the desired strength. Suitable examples of the materials of the battery case 10 include metal materials that are light and have good thermal conductivity (for example, aluminum, stainless steel, nickel-plated steel, and the like).

(3) Electrode Terminal

As illustrated in FIG. 1, the secondary battery 1 according to the present embodiment includes a pair of electrode terminals 20. These electrode terminals 20 are partly exposed to the exterior of the battery case 10. Although the illustration is omitted, each electrode terminal 20 is connected to an electrode body (positive electrode or negative electrode) in the battery case 10. In the present description, an electrode terminal connected to the positive electrode side of the electrode body refers to a "positive electrode terminal", and an electrode terminal connected to the negative electrode side refers to a "negative electrode terminal". Then, as illustrated in FIG. 2, the electrode terminals 20 in the present embodiment includes a first member 30 and a second member 40. Hereinafter, the constituent member of the electrode terminals 20 in the present embodiment is specifically described. Note that the structure of the electrode terminal 20 explained below may be applied to either one of the positive electrode terminal and the negative electrode terminal or both of them.

(a) First Member

The first member 30 is a member having one end positioned in the battery case 10 and another end positioned outside the battery case 10. As illustrated in FIG. 2, the first member 30 includes a shaft part 32 penetrating the battery case 10. The shaft part 32 is a pillar-shaped member extending in the height direction Z. The upper end of this shaft part 32 is exposed to the exterior of the battery case 10 (above the lid 14). The lower end of the shaft part 32 is housed in the battery case 10. The outer shape of the shaft part 32 is not particularly restricted and may be a columnar shape or a prismatic shape. However, considering the easiness of closing the terminal insertion hole 14a of the lid 14 (sealing the battery case 10), the outer shape of the shaft part 32 is preferably columnar. A connection part 34 is formed at the upper end of the shaft part 32 in the present embodiment. The connection part 34 is a plate-shaped member coming into surface contact with a second member 40 that will be described below. Note that the shape of the connection part 34 in plan view is not particularly restricted and may be circular or may be rectangular. In the present embodiment, a rivet part 36 is formed at the lower end of the shaft part 32. The rivet part 36 is formed by crimping for pressedly deforming the lower edge of the tubular-shaped shaft part 32 toward the outside in the radial direction. This rivet part 36 fixes a third member 50, which will be mentioned below, to the battery case 10 (lid 14) and electrically connects the first member 30 and the third member 50.

(b) Second Member

The second member 40 is a plate-shaped member connected to the first member 30 outside the battery case 10. As illustrated in FIG. 1, the second member 40 in the present embodiment is a substantially rectangular plate-shaped member in plan view. The plate-shaped second member 40 is disposed outside the battery case 10 (above the lid 14). Note that the shape of the second member in plan view is not particularly restricted and may be circular. Then, as illustrated in FIG. 2, the bottom surface 40a of the second member 40 (a surface on the battery case 10 side) is in surface contact with the top surface 34a of the connection part 34 of the first member 30. Although details will be described later, a metal junction part 70 is formed on the contact interface between the top surface 34a of this connection part 34 and the bottom surface 40a of the second member 40, and the first member 30 and the second member 40 are connected by the metal junction part 70. A recessed part 42 is formed on the bottom surface side of the second member 40 in the present embodiment, and the connection part 34 of the first member 30 is fitted into the recessed part 42. Due to this constitution, the movement of the second member 40 in the width direction X or the depth direction Y when vibration or external force is applied to the electrode terminal 20 is regulated, and the breakage of the metal junction part 70 by the movement of the second member 40 can be prevented. Furthermore, a locking part 44 protruding toward the shaft part 32 of the first member 30 is formed at the lower edge of the sidewall of the recessed part 42 in the present embodiment. Due to this constitution, the movement of the second member 40 in the height direction Z can be regulated, and therefore, the breakage of the metal junction part 70 by the movement of the second member 40 can be more surely prevented.

(c) Third Member

The electrode terminal 20 in the present embodiment includes a third member 50. Although the illustration is omitted, the third member 50 has a current collector part extending in the height direction Z. The current collector part of this third member 50 is connected to an electrode body (a positive electrode or a negative electrode) at the lower edge thereof. Then, as illustrated in FIG. 2, the upper edge 52 of the third member 50 is bent along the inner surface of the battery case 10 (lid 14). Then, the upper edge 52 of the third member 50 is fixed to the battery case 10 (lid 14) by the rivet part 36 of the first member 30 and electrically connected to the first member 30. Due to this constitution, the electrode body in the battery case 10 and the second member 40 outside the battery case 10 are electrically connected via the third member 50 and the first member 30. Note that this third member 50 is not an essential constitution member of the electrode terminal in the technique disclosed herein. For example, an electrode terminal with no third member can be constructed when a part of the first member is extended in the height direction to connect the electrode body.

(4) Insulating Member

Next, the secondary battery 1 according to the present embodiment includes an insulating member that prevents the conduction between the electrode terminal 20 and the battery case 10. As illustrated in FIG. 2, the insulating member in the present embodiment includes a gasket 62 and an insulator 64.

The gasket 62 is an insulating member disposed on the outer surface (the top surface of the lid body 14) of the battery case 10. The gasket 62 is a box-shaped insulating member having a housing part 62a on the top surface side. The connection part 34 of the first member 30 and the second member 40 are housed in this housing part 62a of the gasket 62. Due to this constitution, the lid 14 and the first member 30 are insulated from each other, and the lid 14 and the second member 40 are insulated from each other. Furthermore, a tubular protrusion part 62b having a terminal insertion hole 62c is formed on the gasket 62 in the present embodiment. This protrusion part 62b of the gasket 62 is inserted into the terminal insertion hole 14a of the lid 14. Then, the protrusion part 62b of the gasket 62 intervenes between the shaft part 32 of the first member 30 and the lid 14 in the terminal insertion hole 14a. Due to this constitution, the first member 30 and the lid 14 can be insulated. The gasket 62 is pressed by crimping when the rivet part 36 of the first member 30 is formed. Therefore, the gasket 62 is compressed between the lid 14 and the second member 40 (or between the lid 14 and the connection part 34). Due to this constitution, gaps generated when each member is assembled to the lid 14 are sealed, and therefore, the distribution of liquid (water intrusion and electrolyte leakage) between the inside and the outside of the battery case 10 can be prevented. Note that the gasket 62 is preferably formed by an easily elastically deformable insulating resin. As examples of the material of the gasket 62, fluorinated resins such as perfluoroalkoxy fluororesins (PFA), polyphenylene sulfide resins (PPS), aliphatic polyamides, and the like may be mentioned.

The insulator 64 is a plate-shaped insulating member having an opening 64a and disposed between the battery case 10 (lid 14) and the third member 50. Due to this constitution, the lid 14 and the third member 50 are insulated. Then, the opening 64a of the insulator 64 is arranged so as to overlap with the terminal insertion hole 62c of the gasket 62 in plan view, and the shaft part 32 of the first member 30 is inserted thereinto. Due to this constitution, the contact between the shaft part 32 of the first member 30 and the lid 14 can be surely prevented. In the crimping when the rivet part 36 is formed at the lower edge of the first member 30, the lower surface of the protrusion part 62b of the gasket 62 is pressed against the periphery of the opening 64a of the insulator 64. Due to this constitution, the gasket 62 and the insulator 64 are crimped, and therefore, the distribution of liquid between the inside and the outside of the battery case 10 can be more surely prevented. Note that the insulator 64 is preferably formed by an easily elastically deformable insulating resin, as with the gasket 62.

(5) Connection between First Member and Second Member

As described above, in the secondary battery 1 according to the present embodiment, a metal junction part 70 is formed on the contact interface between the connection part 34 of the first member 30 and the second member 40. Such a metal junction part 70 is a joining mark formed when the first member 30 and the second member 40 are joined by metal-to-metal joining such as ultrasonic joining, laser welding, or resistance welding. As illustrated in FIG. 2, the metal junction part 70 in the present embodiment is formed on the shaft center SC of the shaft part 32 of the first member 30. As one example, when the metal junction part 70 is formed using ultrasonic joining, the ultrasonic joining may be performed while holding the first member 30 and the second member 40 such that the horn and the anvil are placed on the shaft center SC of the shaft part 32. Note that, although it is not intended to limit the technique disclosed herein, the metal junction part 70 can be substantially circular in plan view, as illustrated in FIG. 3. However, the shape of the metal junction part 70 in plan view can be substantially rectangular (substantially square, substantially oblong) depending on the joining means or the joining condition. Note that, in view of suitably connecting the first member 30 and the second member 40, it is preferred to appropriately adjust the joining condition such that the diameter of the metal junction part 70 will be 0.3 mm or larger. Alternatively, in view of more suitably connecting the first member 30 and the second member 40, the diameter of the metal junction part 70 is more preferably 0.5 mm or larger and particularly preferably 1.0 mm or larger. Meanwhile, the upper limit of the diameter of the metal junction part 70 is not particularly limited, and may be 10.0 mm or smaller, may be 5.0 mm or smaller, and may be 2.0 mm or smaller.

As described above, the first member 30 and the second member 40 can be connected with low resistance and high strength by forming the metal junction part 70 on the contact interface between the connection part 34 of the first member 30 and the second member 40. However, if the metal junction part 70 is thermally deteriorated by application of great heat when a bus bar is connected or the like, the conductivity and the joining strength may greatly decrease. For suppressing such thermal deterioration of the metal junction part 70, a heat-insulating part 80 is formed on the contact interface between the connection part 34 and the second member 40 in the secondary battery 1 according to the present embodiment. This heat-insulating part 80 is formed outward of the metal junction part 70 in the radial direction centered on the metal junction part 70 as illustrated in FIG. 3. This enables to block great heat by the heat-insulating part 80 even when such a great heat is applied to a region above the heat-insulating part 80 or outside the heat-insulating part 80 and therefore, to suppress the heat deterioration of the metal junction part 70 by welding a bus bar or the like.

Note that, in the present embodiment, the heat-insulating part 80 is a cavity formed between the connection part 34 and the second member 40. Specifically, the second member 40 in the present embodiment is provided with a recessed groove 46 separating from the top surface 34a of the connection part 34 on a part of the bottom surface 40a of the second member 40. Due to this constitution, the heat-insulating part 80, constituted of a cavity, can be formed on the connection interface between the connection part 34 and the second member 40. According to such a constitution, the thermal deterioration of the metal junction part 70 can be suppressed at a low cost. Note that the recessed groove for forming the heat-insulating part may be formed on the top surface of the connection part of the first member instead of on the bottom surface of the second member. In addition, the mode of the heat-insulating part is not particularly restricted as long as the heat conduction to the metal junction part can be blocked. For example, the heat-insulating part may be formed by filling a heat-insulating material in a space on the contact interface between the connection part of the first member and the second member. As the heat-insulating material, inorganic heat-insulating materials excellent in heat resistance (such as grass wool, a coating layer containing alumina particles, and a coating layer containing silica particles) are suitable. The thermal deterioration of the metal junction part 70 can be more suitably suppressed by using such a heat insulating material.

In addition, as illustrated in FIG. 3, the heat-insulating part 80 in the present embodiment is a ring-shaped heat-insulating part 80 formed so as to surround the metal junction part 70 in plan view. This ring-shaped heat-insulating part 80 enables to prevent great heat from reaching the metal junction part 70 around the heat-insulating part 80, and therefore, more suitably to suppress the thermal deterioration of the metal junction part 70. Note that the dimension L4 (see FIG. 3) from the inner edge 82 to the outer edge 84 of the ring-shaped heat-insulating part 80 is preferably 3 mm or larger, more preferably 5 mm or larger, and particularly preferably 10 mm or larger. This enables to prevent great heat from reaching the metal junction part 70 more suitably. Note that taking the strength of the member (for example, the second member) on which the recessed groove for forming the heat-insulating part is disposed into consideration, the dimension L4 in FIG. 3 is preferably 50 mm or smaller, more preferably 30 mm or smaller, and particularly preferably 20 mm or smaller.

Note that the technique disclosed herein can be particularly suitably used when the first member and the second member are constituted of dissimilar metal materials. Furthermore, ultrasonic junction is recommended among the above-mentioned metal-to-metal joining methods for connecting this type of dissimilar metals in view of forming a junction part with high strength and low resistance. However, a metal junction part formed by ultrasonic joining tends to show large strength reduction and conductivity reduction after thermal deterioration. On the contrary, the technique disclosed herein can suppress the thermal deterioration of the metal junction part, and therefore, can be particularly suitably used for constructing an electrode terminal having a dissimilar metal bonding recommended to be achieved by ultrasonic joining.

As one example of the dissimilar metal bonding recommended to be achieved by ultrasonic joining, an electrode terminal 20 in which the first member 30 is constituted of a copper material and the second member 40 is constituted of an aluminum material can be mentioned. Since an aluminum material and a copper material tend to show high electrical resistance when joined by thermal welding, the use of ultrasonic joining is recommended. For example, when a negative electrode terminal of a lithium ion secondary battery is connected with a negative electrode of an electrode body (negative electrode current collector), the connection between copper materials is recommended, and when the negative electrode terminal is connected with a bus bar, the connection between aluminum materials is recommended. In such a case, a dissimilar metal-to-metal joining of copper materials and aluminum materials is required in the components of a negative electrode terminal. For this issue, it is preferred to form a metal junction part 70 using ultrasonic joining between the first member 30 made of copper and the second member 40 made of aluminum. Due to this constitution, the first member 30 and the second member 40 can be joined with relatively low resistance. Then, as described above, thermal deterioration of the metal junction part 70 can be suppressed by the heat-insulating part 80 in the technique disclosed herein, and therefore, the joint interface between the first member 30 and the second member 40, which are made of dissimilar metals, can be maintained in a low resistance state. As described above, the technique disclosed herein can be particularly suitably used for constructing a negative electrode terminal of a lithium ion secondary battery for which dissimilar metal-to-metal joining between copper materials and aluminum materials is required. Note that the term "aluminum material(s)" in the present description is a concept encompassing aluminum and alloys mainly composed of aluminum. The term "alloy mainly composed of aluminum" used herein refers to an alloy containing at least 70% or more aluminum. Other elements that may be contained in the aluminum material are not particularly restricted, and examples thereof include silicon, iron, copper, manganese, magnesium, zinc, chromium, titanium, lead, zirconium, and the like. Meanwhile, the term "copper material(s)" is a concept encompassing copper and alloys mainly composed of copper. Note that the term "alloy mainly composed of copper" used herein refers to an alloy containing at least 50% or more copper. Other elements that may be contained in the material are not particularly restricted, and examples thereof include silicon, iron, manganese, magnesium, zinc, chromium, titanium, lead, tin, phosphorus, aluminum, nickel, cobalt, beryllium, zirconium, and the like.

2. Assembled Battery

Figure 4:
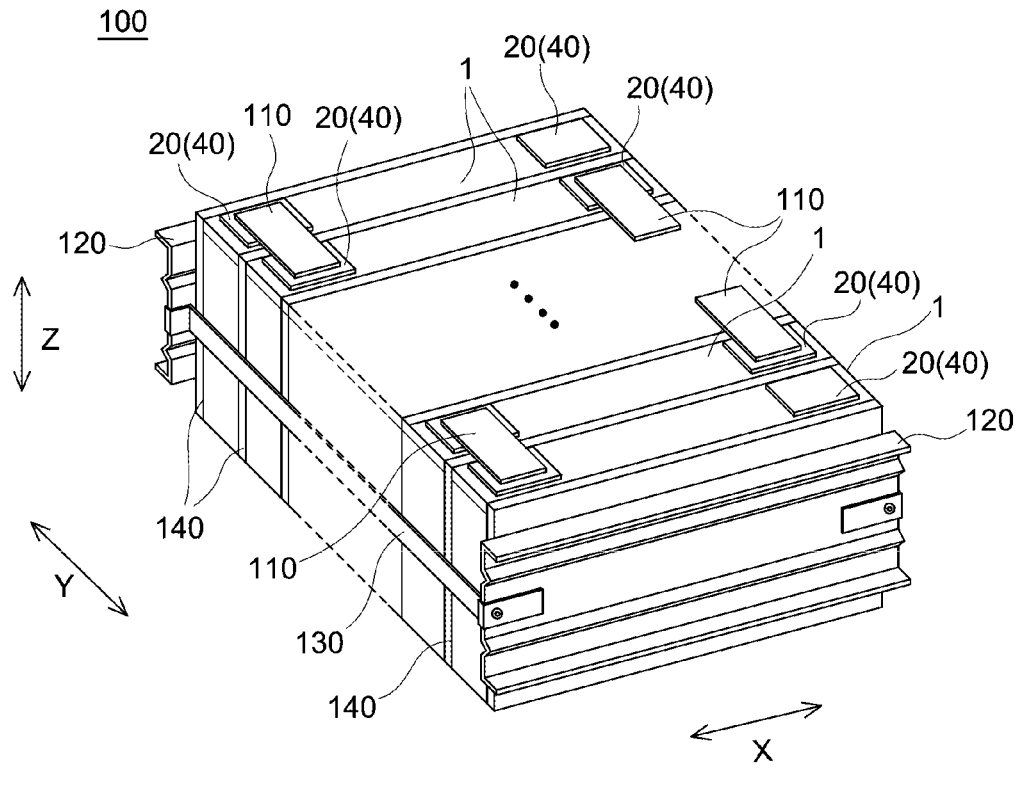
FIG. 4 is a perspective view schematically illustrating an assembled battery according to one embodiment.
Figure 5:
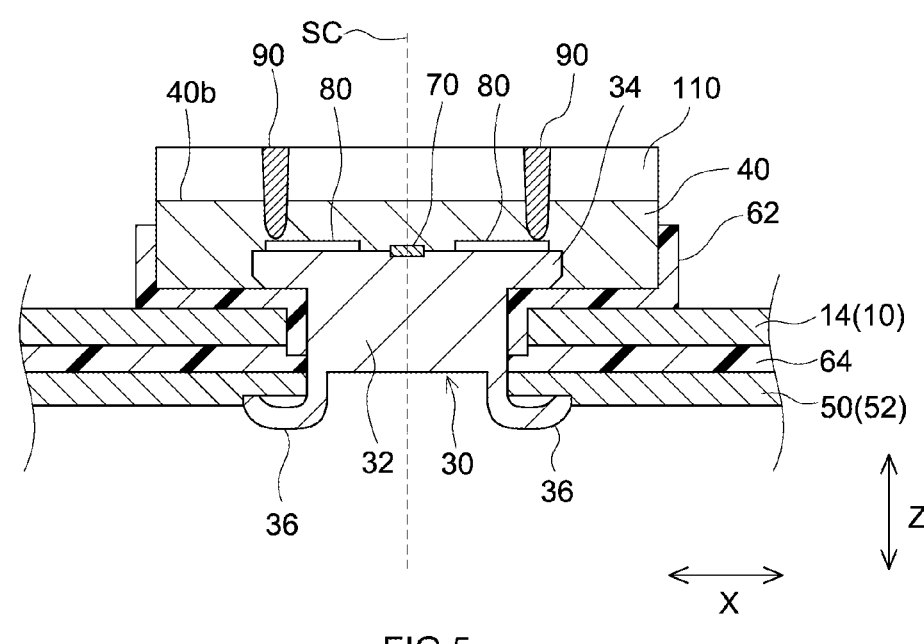
FIG. 5 is a sectional view schematically illustrating the structure of a connection part between an electrode terminal and a bus bar in the assembled battery according to one embodiment.
Figure 6:
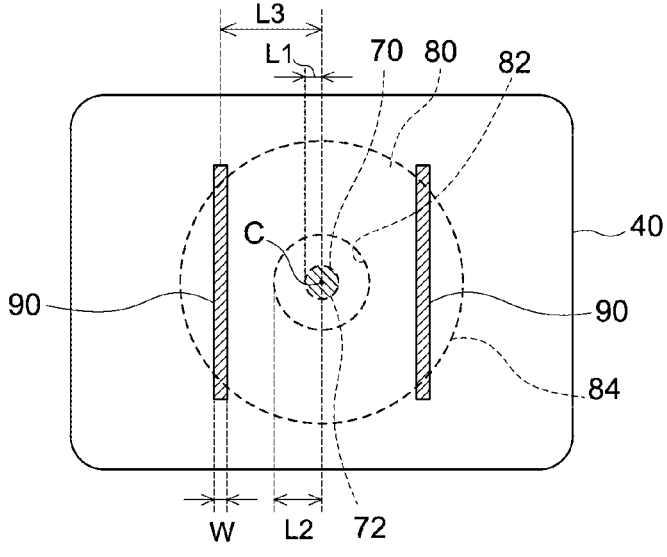
FIG. 6 is a plan view explaining the positional relationship among the metal junction part, the heat-insulating pan, and the thermally welded part in the assembled battery according to one embodiment.

Next, one embodiment of an assembled battery constructed by a plurality of secondary batteries is described as another aspect of the technique disclosed herein. In the following description relating to the assembled battery according to the present embodiment, FIGS. 4 to 6 are mainly referred to. FIG. 4 is a perspective view schematically illustrating an assembled battery according to the present embodiment. FIG. 5 is a sectional view schematically illustrating the structure of a connection part between an electrode terminal and a bus bar in the assembled battery according to the present embodiment. FIG. 6 is a plan view explaining the positional relationship among the metal junction part, the heat-insulating part, and the thermally welded part in the assembled battery according to the present embodiment. Note that, in FIG. 6, the indication of a bus bar 110 is omitted for explanatory convenience, and the formed positions of the metal junction part 70 and the heat-insulating part 80 are indicated as dotted lines. The same applies to FIGS. 7 and 11, which will be described later.

As illustrated in FIG. 4, an assembled battery 100 according to the present embodiment includes a plurality of secondary batteries 1. Specifically, in this assembled battery 100, a plurality of secondary batteries 1 having a flat rectangular battery case 10 are arranged along the depth direction Y such that the flat surfaces face each other. Then, a pair of end plates 120 are arranged on both outsides in the arrangement direction (depth direction Y) of the assembled battery 100. The plurality of secondary batteries 1 are each restrained along the arrangement direction by crosslinking this pair of end plates 120 by a restraining beam material 130. Note that, in the present embodiment, a spacer 140 is disposed between the adjacent secondary batteries 1 in order to equalize the restraint pressure in a flat surface. Note that the number of the secondary batteries 1 constituting the assembled battery 100 is not particularly limited and can be appropriately changed according to the purpose (required electric power of the exterior apparatus, regulation, and the like) of the assembled battery 100. In addition, it is not necessary that all of the plurality of secondary batteries constituting the assembled battery have the constitution described above in the technique disclosed herein. That is, the assembled battery 100 according to the present embodiment may partly include a secondary battery having a different structure from the secondary battery 1 according to the above embodiment.

In the present embodiment, the electrode terminals 20 are connected to each other via the bus bar 110 between adjacent two secondary batteries 1. A metal material excellent in conductivity and strength is used for this bus bar 110. As illustrated in FIG. 5, the bus bar 110 is thermally welded in surface contact with the top surface 40b of the second member 40 of the electrode terminal 20. Then, the thermally welded part 90, which is a joining mark of this thermal welding, is formed so as to penetrate the bus bar 110 to reach the second member 40. Suitable examples of the material of the bus bar 110 in the present embodiment include aluminum materials and the like. Furthermore, in view of preventing the conductivity reduction by thermal welding of dissimilar metal members, the same type of metal material as the second member 40 of the electrode terminal 20 is preferably used for a bus bar 110.

Here, as illustrated in FIGS. 5 and 6, the bus bar 110 and the electrode terminal 20 are thermally welded in the present embodiment such that the thermally welded part 90 is formed above the heat-insulating part 80 formed on the contact interface between the connection part 34 of the first member 30 and the second member 40. Specifically, the laser light is applied to the above part of the heat-insulating part 80 such that a pair of linear thermally welded parts 90 facing each other with the metal junction part 70 interposed therebetween will be formed. Due to this constitution, a thermally welded part 90 can be formed while insulating the heat upon thermal welding by the heat-insulating part 80, and therefore, thermal deterioration of the metal junction part 70 can be suppressed.

Figure 7:
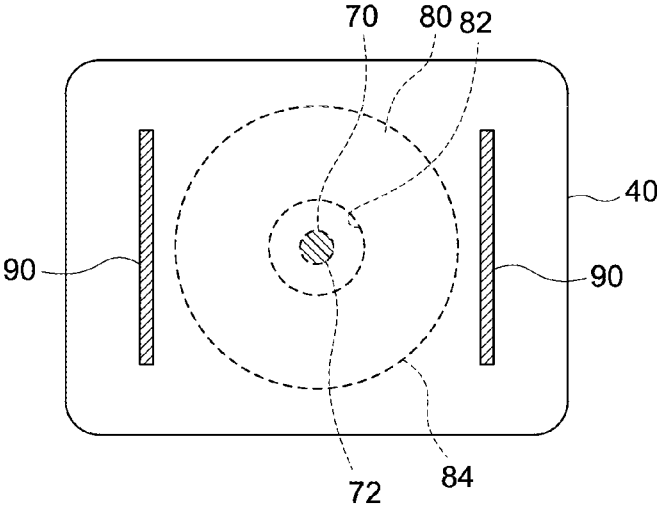
FIG. 7 is a plan view explaining the positional relationship among the metal junction part, the heat-insulating part, and the thermally welded part in an assembled battery according to another embodiment.

Note that, in the technique disclosed herein, the formed position of the thermally welded part 90 (laser applied position in thermal welding) is not limited to the above position of the heat-insulating part 80. For example, as illustrated in FIG. 7, the thermal welding may be performed such that the thermally welded part 90 will be formed outward of the heat-insulating part 80 in the radial direction centered on the metal junction part 70. Also in this case, the heat upon thermal welding can be insulated by the heat-insulating part 80, and therefore, thermal deterioration of the metal junction part 70 can be suppressed.

Note that the formed position of the thermally welded part 90 is preferably adjusted in view of suitably suppressing the thermal deterioration of the metal junction part 70. Specifically, assuming that the distance from the center C of the metal junction part 70 to the outer periphery 72 is taken as L1, the distance from the center C of the metal junction part 70 to the inner edge 82 of the heat-insulating part 80 is taken as L2, and the distance from the center C of the metal junction part 70 to the center of the thermally welded part 90 is taken as L3, the formed position of the thermally welded part 90 is preferably adjusted such that the following formula (1) is satisfied. This enables to prevent great heat upon thermal welding from reaching the metal junction part 70 more suitably. In addition, in view of more surely preventing thermal deterioration of the metal junction part 70, the formed position of the thermally welded part 90 is preferably adjusted so as to satisfy the following formula (2). Note that the following formulas (1) and (2) are conditions that may be applied when the heat-insulating part 80 is a cavity. For example, when the heat-insulating part 80 is filled with a heat-insulating material, it is preferred to adjust the formed position of the thermally welded part 90, taking the heat-insulating performance (heat conductivity) of the heat-insulating material into consideration.

$$L3-L2 > L2-L1 \tag{1}$$

$$L3-L2 > (L2-L1) \times 1.5 \tag{2}$$

In view of more surely preventing thermal deterioration of the metal junction part 70, the condition of the thermal welding (such as welding temperature, scanning speed, or the like) is preferably adjusted such that the width w of the linear thermally welded part 90 satisfies the following formula (3).

$$L3-L2 > w \tag{3}$$

3. Other Embodiments

As stated above, one embodiment of the technique disclosed herein is described. Note that the embodiment mentioned above indicates an example of a secondary battery (or assembled battery) to which the technique disclosed herein is applied and is not intended to limit the technique disclosed herein.

Figure 8:
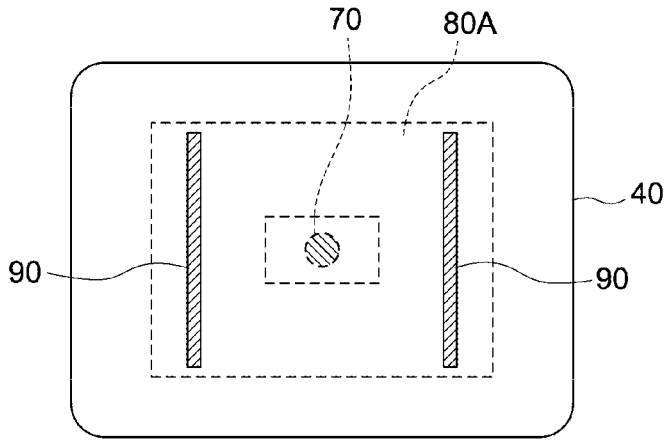
FIG. 8 is a plan view explaining the positional relationship among the metal junction part, the heat-insulating part, and the thermally welded part in the assembled battery according to another embodiment.
Figure 9:
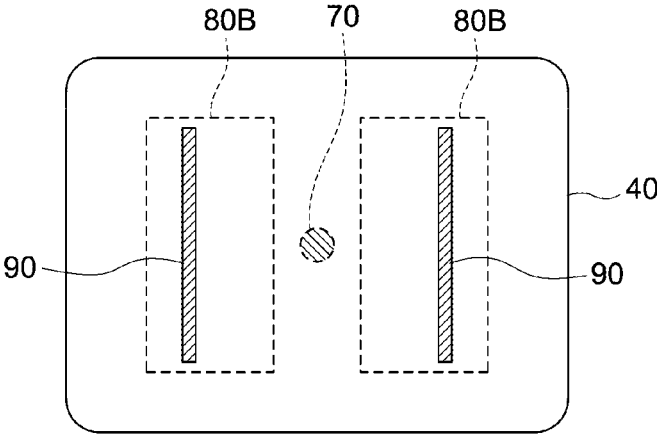
FIG. 9 is a plan view explaining the positional relationship among the metal junction part, the heat-insulating part, and the thermally welded part in the assembled battery according to another embodiment.

For example, in the embodiment mentioned above, a ring-shaped heat-insulating part 80 that surrounds the metal junction part 70 in plan view is formed. However, the specific planar shape of the heat-insulating part is not particularly restricted as long as the heat-insulating part is formed outward of the metal junction part in the radial direction centered on the metal junction part. For example, as illustrated in FIG. 8, the heat-insulating part may be a rectangular ring-shaped heat-insulating part 80A surrounding the metal junction part 70 in plan view. Also, in a case where such a rectangular ring-shaped heat-insulating part 80A is formed, the heat upon forming (thermally welding) the thermally welded part 90 is appropriately insulated, and the thermal deterioration of the metal junction part 70 can be suppressed. Furthermore, the planar shape of the heat-insulating part may not be a ring shape as illustrated in FIGS. 6 to 8. For example, as illustrated in FIG. 9, a pair of planar rectangular heat-insulating parts 80B may be formed so as to face each other with the metal junction part 70 interposed therebetween. Note that, when such a pair of heat-insulating part 80B is formed, the thermally welded part 90 is formed above each heat-insulating part 80B (or at a position outward of each heat-insulating part 80B in the radial direction). Due to this constitution, the heat upon thermal welding is appropriately insulated at the heat-insulating part 80B, and the thermal deterioration of the metal junction part 70 can be suppressed.

Figure 10:
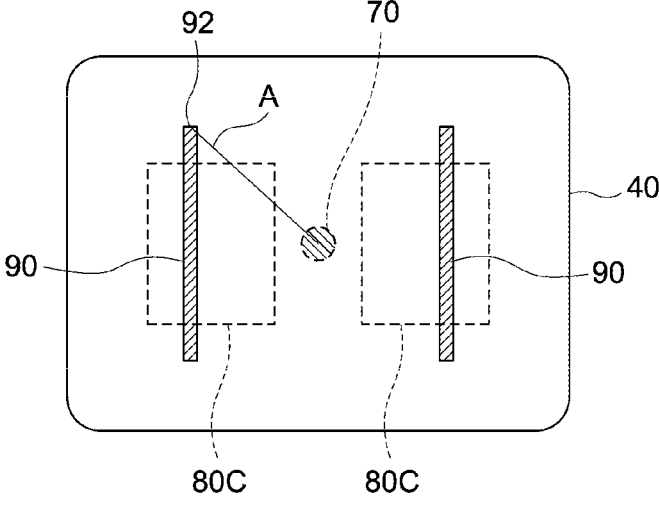
FIG. 10 is a plan view explaining the positional relationship among the metal junction part, the heat-insulating part, and the thermally welded part in an assembled battery according to another embodiment.

In the technique disclosed herein, a region for performing thermal welding (that is, the thermally welded part 90) is not particularly restricted as long as it is above the heat-insulating part (or outward of the heat-insulating part in the radial direction) and may be appropriately changed. For example, as illustrated in FIG. 6 or 10, thermal welding may be performed such that a part of the thermally welded part 90 will be stuck out from the heat-insulating part 80 or 80C. Even in such a case, thermal deterioration of the metal junction part 70 can be sufficiently suppressed as long as the thermally welded part 90 stuck out from the heat-insulating part 80 or 80C is formed outward of the heat-insulating part 80 or 80C in the radial direction centered on the metal junction part 70. For example, thermal welding is performed inn FIG. 10 so that the upper edge 92 of the thermally welded part 90 will be stuck out from the rectangular heat-insulating part 80C. However, the upper edge 92 of the thermally welded part 90 is formed outward of the heat-insulating part 80C when seen on the straight line A connecting the upper edge 92 of the thermally welded part 90 and the metal junction part 70. In this case, the heat upon forming the upper edge 92 of the thermally welded part 90 can be insulated in the heat-insulating part 80C, and therefore, thermal deterioration of the metal junction part 70 can be sufficiently suppressed. However, taking the possibility that the heat going around the heat-insulating part is transmitted to the metal junction part into consideration, it is preferred to form the ring-shaped heat-insulating part 80 or 80A as illustrated in FIGS. 6 to 8.

Figure 11:
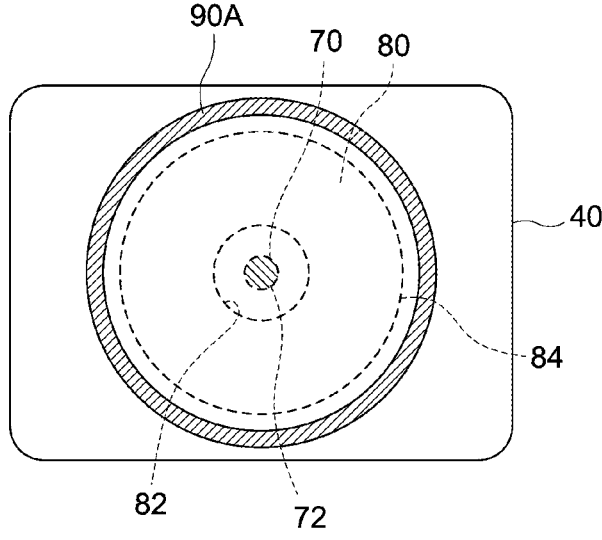
FIG. 11 is a plan view explaining the positional relationship among the metal junction part, the heat-insulating part, and the thermally welded part in an assembled battery according to another embodiment.

Furthermore, in the mode described above, a pair of linear thermally welded parts 90 facing each other with the metal junction part 70 interposed therebetween is formed. However, the planar shape of the thermally welded part is not a linear shape, and various shapes may be adopted. For example, as illustrated in FIG. 11, a ring-shaped thermally welded part 90A surrounding the heat-insulating part 80 may be formed. Also in this case, the heat upon thermal welding can be appropriately insulated by the heat-insulating part 80, and therefore, thermal deterioration of the metal junction part 70 can be suppressed. Note that, in FIG. 11, a ring-shaped thermally welded part 90A having a larger radius than the outer edge 84 of the heat-insulating part 80 is formed, and the thermally welded part 90A is formed outward of the heat-insulating part 80 in the radial direction centered on the metal junction part 70. However, the radius of the thermally welded part 90A may be smaller than the outer edge 84 of the heat-insulating part 80 and larger than the inner edge 82, and the ring-shaped thermally welded part 90A may be formed above the heat-insulating part 80. Even in this case, the heat upon thermal welding is appropriately insulated in the heat-insulating part 80, and thermal deterioration of the metal junction part 70 can be suppressed.

As described above, specific embodiments of the present disclosure are explained in detail, but these are mere examples and do not limit the scope of claims. The invention disclosed in claims encompasses variations and modifications of the above specific embodiments in various ways.

What is claimed is:
1. A secondary battery comprising:
an electrode body;

14 a battery case housing the electrode body; and
an electrode terminal connected to the electrode body in the battery case and partly exposed to an exterior of the battery case,
the electrode terminal including:
a first metal member having one end positioned in the battery case and another end positioned outside the battery case; and
a plate-shaped second metal member covering an entire outer surface of the first metal member and connected to the first metal member at an outside of the battery case,
the first metal member including:
a shaft part penetrating the battery case; and
a plate-shaped connection part that is formed on a top edge of the shaft part and in surface contact with the second metal member, wherein
a metal junction part and a heat-insulating part are formed on a contact interface between a connection part of the first metal member and the second metal member on the outer surface of the first metal member,
the metal junction part is a part formed when the first metal member and the second metal member are joined by metal-to-metal joining performed by one of ultrasonic joining, laser welding, or resistance welding,
the heat-insulating part is formed outward of the metal junction part in a radial direction centered on the metal junction part,
the heat-insulating part comprises a cavity formed by a part of a bottom surface of the second metal member separating from a top surface of the connection part, and
a heat-insulating material is filled in the cavity.
2. The secondary battery according to claim 1, wherein the heat-insulating part is a ring-shaped heat-insulating part formed so as to surround the metal junction part.
3. The secondary battery according to claim 1, wherein the first metal member and the second metal member are constituted of different metal materials.
4. An assembled battery comprising a plurality of secondary batteries mutually electrically connected via a flat plate-shaped bus bar,
at least one of the plurality of secondary batteries is the secondary battery according to claim 1;
the bus bar being thermally welded on a top surface of the second metal member in a surface contact state, the bus bar and the second metal member being connected by a thermally welded part penetrating the bus bar to reach the second metal member; and
the thermally welded part being formed upward of the heat-insulating part, or outward of the heat-insulating part in a radial direction centered on the metal junction part.
5. The assembled battery according to claim 4, wherein, a distance from a center of the metal junction part to an outer periphery of the metal junction part is taken as L1, a distance from a center of the metal junction part to an inner edge of the heat-insulating part is taken as L2, and a distance from a center of the metal junction to a center of the thermally welded part is taken as L3, the following formula (1) is satisfied:

$$L3-L2>L2-L1 \qquad (1).$$

* * * * *